US009965311B2

(12) United States Patent
Tsirkin et al.

(10) Patent No.: US 9,965,311 B2
(45) Date of Patent: May 8, 2018

(54) APPLICATION OF A PATTERN TO INACTIVE PAGES IN GUEST MEMORY

(71) Applicant: Red Hat Israel, Ltd., Ra'anana (IL)

(72) Inventors: Michael Tsirkin, Ra'anana (IL); Uri Lublin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 122 days.

(21) Appl. No.: 14/937,517

(22) Filed: Nov. 10, 2015

(65) Prior Publication Data

US 2017/0132028 A1   May 11, 2017

(51) Int. Cl.
*G06F 9/455* (2006.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| 6,789,156 | B1 | 9/2004 | Waldspurger |
| 8,387,049 | B2 | 2/2013 | Adlung et al. |
| 8,458,284 | B2 | 6/2013 | Huang et al. |
| 2009/0307447 | A1* | 12/2009 | Jacobs ............... G06F 11/0712 711/162 |
| 2012/0185856 | A1* | 7/2012 | Ashihara ............ G06F 9/4856 718/1 |
| 2012/0239850 | A1 | 9/2012 | Qiu et al. |
| 2013/0031292 | A1 | 1/2013 | Van Riel |
| 2013/0031293 | A1 | 1/2013 | Van Reil |
| 2015/0007172 | A1* | 1/2015 | Hudzia ............... G06F 9/45533 718/1 |
| 2015/0058580 | A1 | 2/2015 | Lagar et al. |

(Continued)

OTHER PUBLICATIONS

Michael R. Hines and Kartik Gopalan, "Post-Copy Based Live Virtual Machine Migration Using Adaptive Pre-Paging and Dynamic Self-Ballooning," Mar. 11-13, 2009, pp. 1-10, Computer Science, Binghamton University, retrieved on Nov. 10, 2015 from http://osnet.cs.binghamton.edu/publications/TR-20080702.pdf.

(Continued)

*Primary Examiner* — Gregory A Kessler
(74) *Attorney, Agent, or Firm* — Haynes and Boone, LLP

(57) ABSTRACT

Systems and methods are disclosed for migrating a virtual machine from a source hypervisor to a destination hypervisor. An example method of migrating a virtual machine from a source hypervisor to a destination hypervisor includes receiving, by a source hypervisor running a virtual machine, an indication to migrate the virtual machine to a destination hypervisor. A guest runs on the virtual machine and is allocated a plurality of pages in guest memory. The method also includes sending, by the source hypervisor, a request to the guest to apply a pattern to one or more inactive pages of the plurality of pages in response to receiving the indication to migrate the virtual machine. For each page of a plurality of pages traversed by the source hypervisor, the method includes determining whether the traversed page matches the pattern, and transmitting the traversed page to the destination hypervisor if the traversed page does not match the pattern.

20 Claims, 7 Drawing Sheets

(56) References Cited

U.S. PATENT DOCUMENTS

2015/0378771 A1* 12/2015 Tarasuk-Levin .... G06F 9/45558
718/1

OTHER PUBLICATIONS

Erik Gustafsson, "Optimizing Total Migration Time in Virtual Machine Live Migration," Mar. 2013, pp. 1-47, retrieved on Nov. 10, 2015 from http://www.diva-portal.org/smash/get/diva2:609356/fulltext01.pdf.
"Support Madvise(MADV_FREE)", Mar. 20, 2014, Eklektix, Inc., pp. 1-3, retrieved on Nov. 10, 2015 from https://lwn.net/Articles/591214/.
Robert Grimm, "Virtual Machine Monitors: Disco and Xen," pp. 1-32, New York University, retrieved on Nov. 10, 2015 from https://cs.nyu.edu/rgrimm/teaching/sp08-os/vmms.pdf.

* cited by examiner

APPLICATION OF A PATTERN TO INACTIVE PAGES IN GUEST MEMORY

FIELD OF DISCLOSURE

The present disclosure generally relates to virtualization, and more particularly to using applying a pattern to inactive memory pages in guest memory in relation to virtual machine migration.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including OSs known as guests or guest OSs. The hypervisor virtualizes the underlying hardware of the host machine or emulates hardware devices, making the use of the VM transparent to the guest OS or the remote client that uses the VM. Typically, a hypervisor manages allocation and virtualization of computer resources and performs context switching, as may be necessary, to cycle between various VMs.

In a virtual environment, a VM running on a host machine may be migrated. Various considerations may be taken into account before the VM is migrated. For example, migrating a large VM may take a long time. As new technologies make VMs with terabytes of memory possible, and as network speeds and CPU cache sizes are growing more slowly, migration times may increase due to the need to move all VM memory across the network or even just read it on the hypervisor (e.g., to compress for faster transmission across the network).

BRIEF SUMMARY

This disclosure relates to migration of a virtual machine from a source hypervisor to a destination hypervisor. Methods, systems, and techniques for migration of a virtual machine in relation to using a pattern to indicate inactive memory pages that may be skipped are provided.

According to an embodiment, a method of migrating a virtual machine from a source hypervisor to a destination hypervisor includes receiving, by a source hypervisor running a virtual machine, an indication to migrate the virtual machine to a destination hypervisor. A guest runs on the virtual machine and is allocated a plurality of pages in guest memory. The method also includes sending, by the source hypervisor, a request to the guest to apply a pattern to one or more inactive pages of the plurality of pages in response to receiving the indication to migrate the virtual machine. The method further includes traversing, by the source hypervisor, the plurality of pages. For each page of the plurality of pages traversed by the source hypervisor, the method includes determining whether the traversed page matches the pattern and transmitting the traversed page to the destination hypervisor if the traversed page does not match the pattern.

According to another embodiment, a system for migrating a virtual machine from a source hypervisor to a destination hypervisor includes a guest memory that stores a pattern and a plurality of memory pages. The system also includes a source hypervisor that runs a virtual machine and receives an indication to migrate the virtual machine to a destination hypervisor. The source hypervisor sends a request to apply the pattern to one or more inactive pages of the plurality of pages in response to receiving the indication to migrate the virtual machine. The system further includes a guest running on the virtual machine. The guest memory is allocated to the guest. The guest receives the request from the source hypervisor, determines that the first one of the plurality of memory pages is inactive, and applies the pattern to the first one of the plurality of memory pages in response to a determination that the first one of the plurality of memory pages is inactive.

According to another embodiment, a non-transitory machine-readable medium includes a plurality of machine-readable instructions that when executed by one or more processors are adapted to cause the one or more processors to perform a method including: receiving, by a source hypervisor running a virtual machine, an indication to migrate the virtual machine to a destination hypervisor, where a guest runs on the virtual machine and is allocated a plurality of pages in guest memory; sending, by the source hypervisor, a request to the guest to apply a pattern to one or more inactive pages of the plurality of pages in response to receiving the indication to migrate the virtual machine; traversing, by the source hypervisor, the plurality of pages; and for each page of the plurality of pages traversed by the source hypervisor: determining whether the traversed page matches the pattern; and transmitting the traversed page to the destination hypervisor if the traversed page does not match the pattern.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
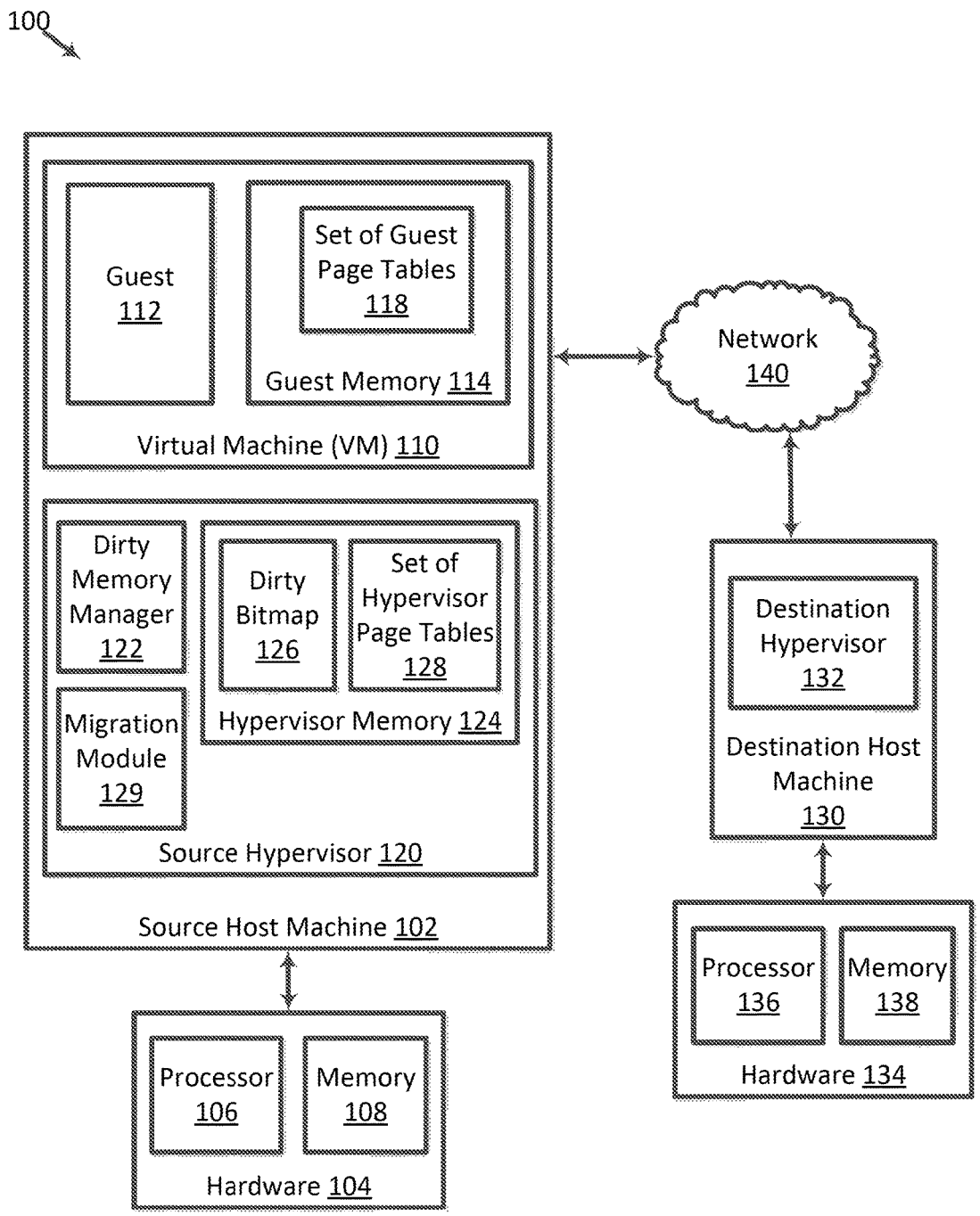
FIG. 1 is a block diagram illustrating a system for migrating a virtual machine from a source hypervisor to a destination hypervisor in accordance with one or more embodiments.

Embodiments of the present disclosure and their advantages are best understood by referring to the detailed description that follows.

DETAILED DESCRIPTION

I. Overview
II. Example System Architecture
  A. Page Tables
  B. Source Hypervisor Maintains a Dirty Bitmap
  C. Guest Memory
III. Virtual Machine Migration from Source Hypervisor to Destination Hypervisor
  A. Indication to Migrate Virtual Machine
  B. Active versus Inactive Memory Pages in Guest Memory
    1. Guest Applies Pattern to Inactive Memory Pages in Guest Memory
    2. Source Hypervisor Transmits or Skips Guest Memory Pages Depending on Whether They Match the Pattern
  C. Live Virtual Memory Migration
  D. Allocate Memory at the Destination Hypervisor
IV. Example Methods
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A virtual machine (VM) running on a source host machine may be migrated to a destination host machine. A source host machine may refer to a host machine running a VM. A destination host machine may refer to the host machine to which the VM running on the source host machine migrates. A plurality of VMs may run on the same host machine, and one or more VMs running on the source host machine may be migrated to the destination host machine. A VM running on a host machine may be migrated to another host machine or a logical partition within the same host machine.

The present disclosure provides techniques to speed up the migration of VMs. The migration of a VM from a source hypervisor to a destination hypervisor typically includes transmitting the memory pages in guest memory that is allocated to a guest running on the VM to the destination hypervisor. It may be desirable to reduce the amount of memory pages in guest memory that is moved between hypervisors to reduce migration time.

In some embodiments, a system for migrating a virtual machine from a source hypervisor to a destination hypervisor includes a guest memory that stores a pattern and a plurality of memory pages. The system also includes a source hypervisor that runs a virtual machine and receives an indication to migrate the virtual machine to a destination hypervisor. The source hypervisor sends a request to apply the pattern to one or more inactive pages of the plurality of pages in response to receiving the indication to migrate the virtual machine. The system further includes a guest running on the virtual machine. The guest memory is allocated to the guest. The guest receives the request from the source hypervisor, determines that the first one of the plurality of memory pages is inactive, and applies the pattern to the first one of the plurality of memory pages in response to a determination that the first one of the plurality of memory pages is inactive.

Unless specifically stated otherwise, as apparent from the following discussion, it is appreciated that throughout the description, discussions utilizing terms such as "determining," "sending," "reading," "receiving," "transmitting," "traversing," "executing," "storing," "applying," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a system 100 for migrating a virtual machine from a source hypervisor to a destination hypervisor in accordance with one or more embodiments. System 100 includes a source host machine 102 coupled to hardware 104. Hardware 104 includes a processor 106 and memory 108, and may include other input/output (I/O) devices. A host machine may run one or more virtual machines (VMs) that run applications and services.

Source host machine 102 includes a VM 110 and a source hypervisor 120. Although one VM is illustrated as running on source host machine 102, other embodiments including more than one VM are within the scope of the present disclosure. The hypervisor may allow multiple operating systems, called guests or guest operating systems, to run on the same physical system by offering virtualized hardware to the guest. The host machine may run multiple operating systems, concurrently and in isolation from other programs on a single system. A guest running on the VM may be different from the host OS running on host machine. The host OS or guest may include, for example, MICROSOFT® WINDOWS®, LINUX®, SOLARIS®, and MAC® OS. Trademarks are the property of their respective owners.

A. Page Tables

In a virtualization environment, the hypervisor and each guest running in a host machine has its own set of page tables. Source hypervisor 120 includes a dirty memory manager 122, hypervisor memory 124, and migration module 129. Source hypervisor 120 maintains a dirty bitmap 126 and a set of hypervisor page tables 128 in hypervisor memory 124. Set of hypervisor page tables 128 includes one or more mappings from guest-physical memory addresses to host-virtual memory addresses and then to host-physical memory addresses, which correspond to physical memory on a native platform. Host-physical memory is hardware memory.

Additionally, each guest maintains its own set of page tables. Guest 112 running on VM 110 may be provided with a guest memory 114. Source hypervisor 120 may allocate guest memory 114 to guest 112. Guest 112 maintains a set of guest page tables 118 in guest memory 114. Set of guest page tables 118 includes one or more mappings from guest-virtual memory addresses to guest-physical memory addresses, which are guest 112's illusion of physical memory. This illusion is supported by source hypervisor 120, which maps guest 112's guest-physical memory addresses to host-virtual memory addresses and then to host-physical memory addresses. The combined total size of the guest-physical memory space of all the guests running on source host machine 102 may be bigger than the actual physical memory on the system.

Each entry in a guest page table maps a location in guest 112's virtual memory space to a location in guest 112's physical memory space. Address translation in guest 112 transforms addresses in its guest-virtual address space to locations in guest-physical memory using set of guest page tables 118. To convert a guest-physical memory address to a host-physical memory address, source hypervisor 120 maintains a real map table mapping guest-physical memory pages to host-physical memory pages, and in particular uses set of hypervisor page tables 128 to translate guest-physical memory addresses to host-physical memory addresses.

B. Source Hypervisor Maintains a Dirty Bitmap

Dirty memory manager 122 maintains a dirty bitmap 126 that tracks guest usage of memory pages. Dirty bitmap 126 is located in hypervisor memory 124 and may change at any time. A memory page that is written by a guest is a "dirty page" and may be reset to a "clean page." Dirty bitmap 126 stores a plurality of bits, where each bit has a zero or a one value corresponding to a memory page in guest memory 114. Dirty bitmap 126 includes dirty bits that indicate whether a memory page in guest memory 114 has been updated ("dirty") or has not been updated ("not dirty") by guest 112. A first set of bits in dirty bitmap 126 that has a first value (e.g., 0) indicates that the guest has updated a first set of pages corresponding to the first set of bits. A second set of bits in dirty bitmap 126 that has a second value (e.g., 1) indicates that the guest has not updated a second set of pages corresponding to the second set of bits. Although a bit having a first value (e.g., 0) has been described as being dirty and a bit having a first value (e.g., 1) has been described as being clean, it should be understood that the bits may have different values that indicate whether they are clean or dirty. For example, a first set of bits in dirty bitmap 126 that has a value of 1 may indicate that the memory page corresponding to the bit is not dirty (clean) and a second set of bits in dirty bitmap 126 that has a value of 0 may indicate that the memory page corresponding to the bit is dirty.

Source hypervisor 120 may access dirty bitmap 126 in a variety of ways. In an example, source hypervisor 120 marks the pages in guest memory 114 as read-only. When guest 112 writes to a memory page in guest memory 114, the memory access is trapped into source hypervisor 120. Based on this trap, source hypervisor 120 may set a bit corresponding to the memory page to a first value in dirty bitmap 126, where the first value indicates that the page is dirty. Accordingly, when hypervisor gets a trap, it can be a read-only trap or a "log some pages that have become dirty" trap. In another example, dirty bits are stored in set of hypervisor page tables 128, and source hypervisor 120 traverses the page table entries one-by-one, fetches the bits corresponding to the dirty bits, and writes the dirty bits in dirty bitmap 126. In another example, dirty bits are stored in set of hypervisor page tables 128 and processor 106 informs source hypervisor 120 which bits have been set so that it may be unnecessary for source hypervisor 120 to traverse the page table entries one-by-one.

Although the data structure that is used by source hypervisor 120 (e.g., dirty bitmap 126) to track guest 112's usage of guest memory pages is illustrated as being a bitmap, this is not intended to be limiting and other embodiments having a data structure different from a bitmap are within the scope of the present disclosure. For example, the data structure may be any data structure that stores values that correspond to memory pages in guest memory 114 and that indicate guest 112's usage of the memory pages in guest memory 114. Further, although a cleared bit may be described as indicating an active memory page and a set bit may be described as indicating an inactive memory page, this is not intended to be limiting. Any values (represented by one or more bits) may be used to indicate an active memory page or an inactive memory page.

C. Guest Memory

A memory page is inactive if it is not in use by guest 112 and guest 112 does not care about the data stored in the memory page. In contrast, a memory page is active if it is used by guest 112 and guest 112 cares about the data stored in the memory page. An active memory page may be reset as an inactive memory page if guest 112 frees the memory page. Guest memory 114 stores a pattern 150 that is used by guest 112 to indicate if a memory page in guest memory 114 is inactive. For example, guest 112 may apply pattern 150 to the inactive memory pages. In this example, if source hypervisor 120 reads a memory page that matches pattern 150, the source hypervisor 120 may determine that the memory page is inactive in guest memory 114. Pattern 150 may vary. In some examples, pattern 150 may be a zero page pattern (e.g., containing all zeros). In some examples, pattern 150 may be a one page pattern (e.g., containing all ones). Pattern 150 may be any pattern of bits to store in a memory page, where the pattern is distinguishable by guest 112 and source hypervisor 120 as representing an inactive memory page.

III. Virtual Machine Migration from Source Hypervisor to Destination Hypervisor In FIG. 1, source host machine 102 is coupled to a destination host machine 130 over a network 140. Destination host machine 130 includes a destination hypervisor 132 and is coupled to hardware 134. Hardware 134 includes a processor 136 and memory 138. Network 140 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A. Indication to Migrate Virtual Machine

Figure 2A:
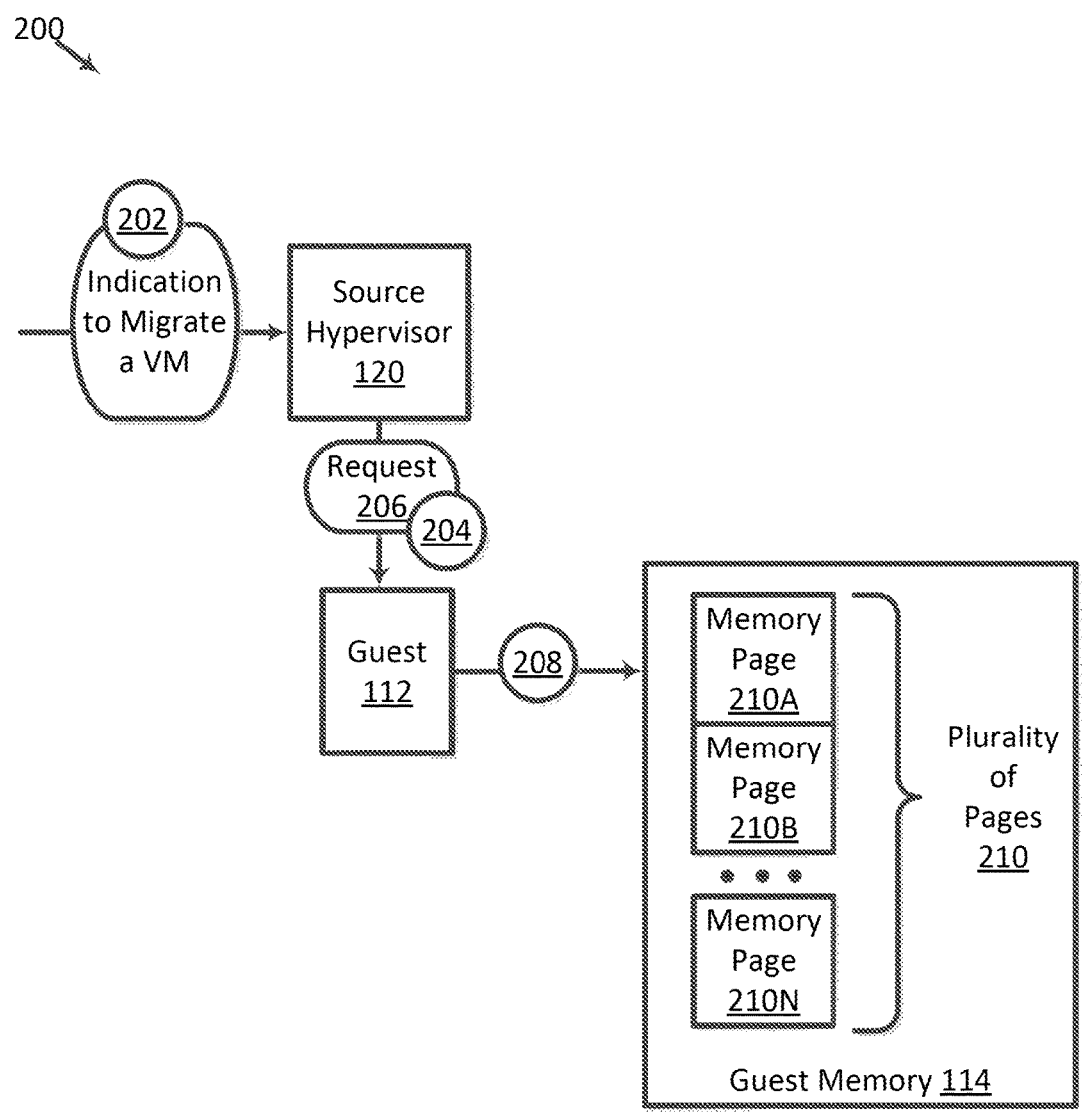
FIGS. 2A and 2B are process flows illustrating the migration of a virtual machine from a source hypervisor to a destination hypervisor in relation to applying a pattern to inactive memory pages in guest memory in accordance with one or more embodiments.
Figure 2B:
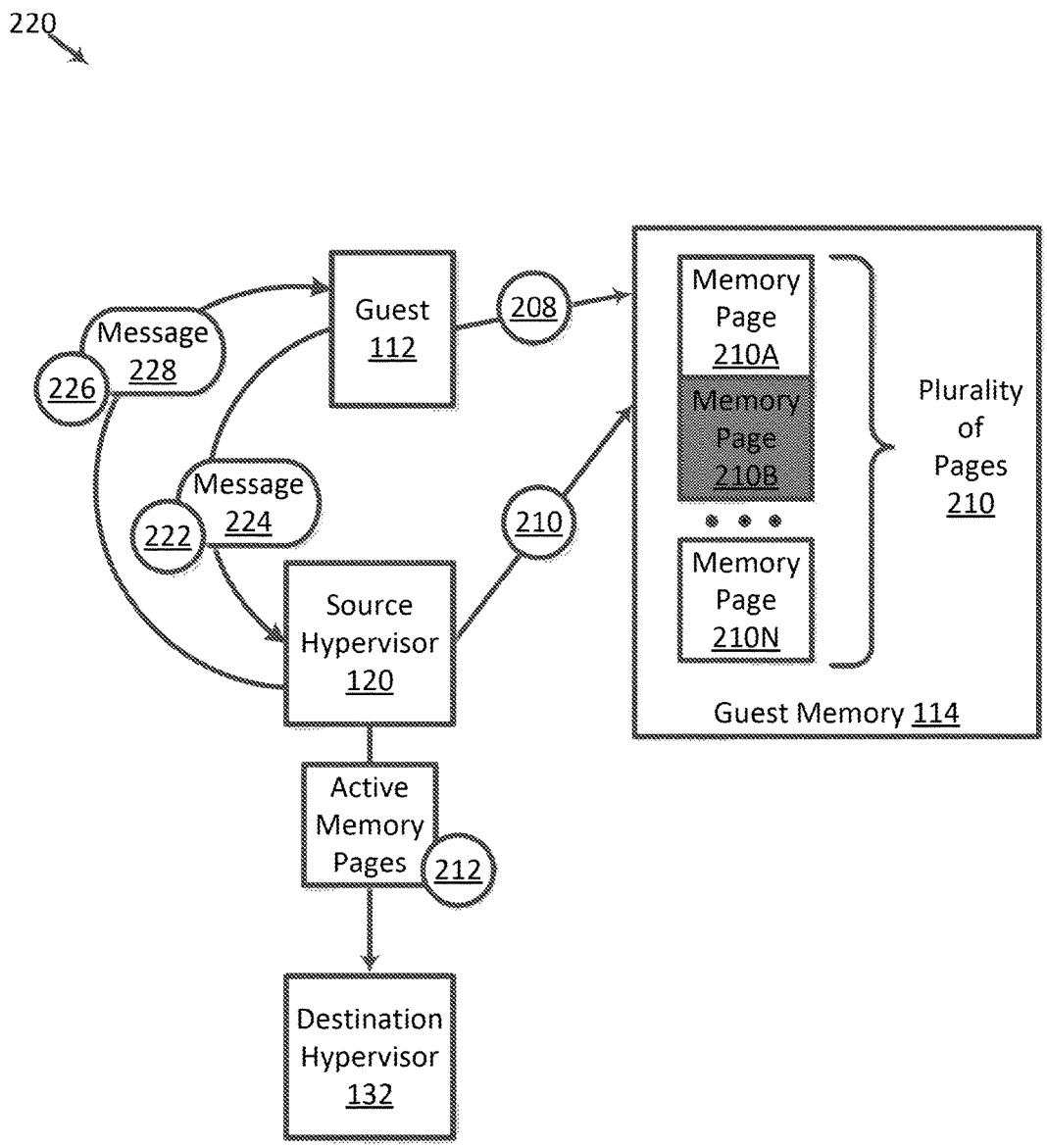

FIGS. 2A and 2B are process flows 200, 220 illustrating the migration of a virtual machine from a source hypervisor to a destination hypervisor in relation to applying a pattern to inactive memory pages in guest memory in accordance with one or more embodiments. In FIG. 2A, at an action 202, source hypervisor 120 may receive an indication to migrate VM 110 to destination hypervisor 132. Migration module 129 may assist in migrating VM 110 from the source hypervisor to destination hypervisor 132. Migration module 129 transfers data stored in guest memory 114 to a memory of destination host machine 130.

A VM may be migrated for a variety of reasons. In an example, migration module 129 knows that source hypervisor 120 is about to crash and migrates the VM to destination hypervisor 132. In this way, the VM may remain active after source hypervisor 120 crashes. In another example, a user wishing to update or service source hypervisor 120 may notify guest 112 running in VM 110 of the migration. For instance, the user may wish to restart or reboot source host machine 102. In response to the notification, guest 112 may request that migration module 129 initiate migration of VM 110 to destination hypervisor 132.

In another example, source host machine 102 may be resource constrained and VM 110 may be migrated to destination host machine 130 for load balancing purposes. For instance, the hypervisor administrator may be aware that source host machine 102 is resource constrained and desires to reduce the load on source host machine 102. The hypervisor administrator may be, for example, a software module or a human being. In another example, destination host machine 130 may have more computing resources available compared to source host machine 102 running the VM.

B. Active Versus Inactive Memory Pages in Guest Memory

In FIG. 2A, guest memory 114 includes a plurality of pages 210, which includes memory pages 210A-210N. In some examples, plurality of pages 210 includes all of the memory pages allocated to guest 112 in guest memory 114. Migration module 129 may transmit each memory page in guest memory 114 to destination hypervisor 132. If a memory page in guest memory 114 is active, then the memory page is being used by guest 112. In order for VM 110 to be successfully migrated to destination hypervisor 132, source hypervisor 120 should send guest 112's active memory pages to destination hypervisor 132. Source hypervisor 120 may transmit a memory page in guest memory 114 to destination hypervisor 130 in response to determining that the memory page is active.

If a memory page in guest memory 114 is inactive, then the memory page is not being used by guest 112. Accordingly, it may be unnecessary to send inactive memory pages to destination hypervisor 132. It may be desirable for source hypervisor 120 to skip inactive memory pages and not transmit them to destination hypervisor 132. An advantage of not transmitting inactive memory pages to destination hypervisor 132 is the reduction in data transmitted across the network, which may result in VM 110's quicker migration to destination hypervisor 132 compared to transmitting all of guest 112's memory pages in guest memory 114. This may speed up migration because a VM 110 typically uses only a small portion of its allocated memory.

1. Guest Applies Pattern to Inactive Memory Pages in Guest Memory

At an action 204, source hypervisor 120 sends a request 206 to guest 112 to perform an operation of applying a pattern 150 to one or more inactive pages of plurality of pages 210. Source hypervisor 120 may send request 206 to guest 112 in response to receiving the indication to migrate VM 110. Guest 112 may receive request 206 to apply pattern 150 to one or more inactive pages of plurality of pages 210.

At an action 208, guest 112 traverses each page of plurality of pages 210. For one or more pages traversed by guest 112, guest 112 determines whether the traversed page is inactive. Guest 112 applies pattern 150 to the traversed page if the traversed page is inactive. In an example, pattern 150 is a zero page pattern, and guest 112 "zeros" out the inactive memory page. In this example, after guest 112 applies pattern 150 to the inactive memory page, it contains all zeros. In this way, guest 112 may mark those memory pages that are inactive. In contrast, guest 112 does not apply pattern 150 to the traversed page if the traversed page is active.

In the example illustrated in FIG. 2A, in response to request 206, guest 112 may traverse the memory pages in guest memory 114 from the bottom to the maximum memory. For example, guest 112 may determine whether memory page 210A is inactive. If memory page 210A is not inactive (i.e., it is an active memory page), guest 112 may determine to not apply pattern 150 to memory page 210A and may traverse the next memory page 210B in guest memory 114. If guest 112 does not apply pattern 150 to memory page 210A, then memory page 210A does not match pattern 150. In contrast, if memory page 210A is inactive, guest 112 may apply pattern 150 to memory page 210A and then traverse the next memory page 210B in guest memory 114. If guest 112 applies pattern 150 to memory page 210A, then memory page 210A matches pattern 150.

In FIG. 2B, guest 112 may traverse memory page 210B and determine whether it is inactive. In the example illustrated in FIG. 2B, guest 112 determines that memory page 210B is inactive. Accordingly, guest 112 applies pattern 150, which is represented by the shaded pattern, to memory page 210B. If pattern 150 is a zero page pattern, then guest 112 "zeros" out memory page 210B, which then contains all zeros. Guest 112 continues to traverse the memory pages in guest memory 114 until all of the memory pages have been traversed and applies pattern 150 to those memory pages that are inactive.

2. Source Hypervisor Transmits or Skips Guest Memory Pages Depending on Whether they Match the Pattern The migration of VM 110 from source hypervisor 120 to destination hypervisor 132 may occur in two phases. In FIG. 2B, actions 210 and 212 may illustrate the first phase of the VM migration. Actions 210 and 212 may occur simultaneously and/or one after the other. During the first phase of migration and at action 210, source hypervisor 120 may traverse plurality of pages 210 in guest memory 114. At action 212, source hypervisor 120 transmits active memory pages of plurality of pages 210 to destination hypervisor 132.

In some examples, for each page of plurality of pages 210 traversed by source hypervisor 120, source hypervisor 120 determines whether the traversed page matches the pattern. Source hypervisor 120 transmits the traversed page to destination hypervisor 132 if the traversed page does not match the pattern (action 212). If the traversed page does not match pattern 150, then source hypervisor 120 knows that the traversed page is active and guest 112 cares about its contents. Accordingly, the active memory page should be transmitted to destination hypervisor 132.

In contrast, source hypervisor 120 does not transmit the traversed page to destination hypervisor 132 if the traversed page matches the pattern. If the traversed page matches pattern 150 (e.g., contains all zeros if pattern 150 is a zero page pattern), then source hypervisor 120 knows that the traversed page is inactive and guest 112 does not care about its contents. Accordingly, it may be unnecessary to transmit the inactive memory page. In this example, source hypervisor 120 may send an indication to destination hypervisor 132 that the traversed page is inactive in guest memory 112 if the traversed page matches pattern 150. The indication may be, for example, a marker that the particular memory page is inactive rather than sending 4K zero bits if the memory page is a 4 kilobyte (KB) page.

In an example, an active memory page in guest memory 114 may store the pattern. For example, a program that allocates 16 Kilobytes (KBs) of memory and zeros them out would have four active memory pages that contain only zeros. If source hypervisor 120 reads these four active memory pages, source hypervisor 120 may assume that they are inactive and thus skip them. In some examples, to ensure that the proper data is transmitted to destination hypervisor 132, destination hypervisor 132 may fill all "un-transmitted" pages with the pattern and store the pages. In some examples, if source hypervisor 120 finds a memory page in guest memory 114 that matches pattern 150, source hypervisor 120 sends a code (e.g., pageN, pattern) to destination hypervisor 132.

In an example, source hypervisor 120 scans set of guest page tables 218 to determine whether a memory page is inactive. For example, a bit stored in set of guest page tables 218 may correspond to a guest memory page and indicate whether the guest memory page is inactive. Source hypervisor 120 may send a memory page in response to a determination that the memory page is active, and may skip a memory page in response to a determination that the memory page is inactive. In this example, it may be unnecessary for destination hypervisor 132 to apply pattern 150 at the destination for inactive memory pages. If source host machine 102 scans set of guest page tables 218, it may be unnecessary for source hypervisor 120 to determine whether a memory page matches pattern 150.

It may be desirable for source hypervisor 120 to wait a threshold amount of time before traversing plurality of pages 210 to identify those inactive guest memory pages to skip. Source hypervisor 120 skips a memory page if the memory page is traversed but is not transmitted to destination hypervisor 132 (e.g., because the memory page matches pattern 150). It would be a waste of computing resources for source hypervisor 120 to traverse plurality of pages 210 to identify those active and inactive memory pages before guest 112 has had sufficient time to traverse and mark a threshold amount of inactive memory pages in guest memory 114. In some examples, during the first phase of migration, source hypervisor 120 traverses plurality of pages 210 after a condition is satisfied. In an example, the condition is satisfied after a threshold amount of time has elapsed (e.g., 10 seconds, 30 seconds, or two minutes). In this example, source hypervisor 120 provides guest 112 with a "head start" in traversing plurality of pages 210 and applying pattern 150 to the inactive ones. Source hypervisor 120 may then traverse plurality of pages 210 and identify inactive guest memory pages to skip based on determining whether they match pattern 150. In another example, the condition is satisfied in response to source hypervisor 120 receiving a message from guest 112, where the message indicates that guest 112 has traversed a threshold amount of pages of plurality of pages 210. In another example, the condition is satisfied in response to source hypervisor 120 receiving a message from guest 112 indicating that guest 112 has traversed a threshold percentage of pages of plurality of pages 210.

In some examples, source hypervisor 120 may send multiple consecutive requests for guest 112 to apply the pattern to inactive memory pages of a set of consecutive memory pages. For example, source hypervisor 120 may send a request for guest to traverse the first 1,000 memory pages and apply pattern 150 to inactive memory pages of the first 1,000 memory pages, and then send a request for guest to traverse the next 1,000 memory pages and apply pattern 150 to inactive memory pages of the this set of 1,000 memory pages, and so on. For each request from source hypervisor 120, guest 112 may send confirmation of completion of the request.

In some examples, source hypervisor 120 traverses plurality of pages 210 a chunk of memory pages at a time based on multiple conditions being satisfied. In an example, guest 112 traverses a first threshold amount of pages of plurality of pages 210. At an action 222, guest 112 sends source hypervisor 120 a first message 224 indicating that guest 112 has traversed the first threshold amount of pages (e.g., 100 memory pages). A first condition may be satisfied in response to source hypervisor 120 receiving first message 224. Source hypervisor 120 may traverse a first amount of memory pages of plurality of pages 210 in response to the first condition being satisfied, and transmit those traversed memory pages that are active to destination hypervisor 132 and skip those that are inactive.

Before source hypervisor 120 continues to traverse the remaining memory pages of plurality of pages 210 after the first amount of memory pages is traversed, source hypervisor 120 may wait for a second condition to be satisfied. Guest 112 may traverse a second threshold amount of pages of plurality of pages 210 and send source hypervisor 120 a second message indicating that guest 112 has traversed the second threshold amount of pages (e.g., the next 150 memory pages after the first threshold amount of pages). The second condition may be satisfied in response to source hypervisor 120 receiving the second message. Source hypervisor 120 may traverse a second amount of memory pages of plurality of pages 210 in response to the second condition being satisfied, and transmit those traversed memory pages that are active to destination hypervisor 132 and skip those that are inactive. Source hypervisor 120 may continue to wait for these messages indicating guest 112's progress in traversing plurality of pages 210 before traversing chunks of memory pages in guest memory 114.

In some examples, the condition(s) may correspond to a threshold percentage of memory pages being traversed by guest 112 rather than a threshold amount of memory pages being traversed by guest 112. For example, guest 112 traverses a first percentage of pages of plurality of pages 210 (e.g., 10% of the memory pages in guest memory 114) and sends source hypervisor 120 first message 224 indicating that guest 112 has traversed the threshold percentage of pages. A first condition may be satisfied in response to source hypervisor 120 receiving this first message. Source hypervisor 120 may traverse a first amount (or percentage) of memory pages of plurality of pages 210 in response to the first condition being satisfied, and transmit those traversed memory pages that are active to destination hypervisor 132 and skip those that are inactive. Source hypervisor 120 may wait for a second condition to be satisfied before traversing the remaining memory page of plurality of pages 210.

If source hypervisor 120 has transmitted each active memory page of plurality of pages 210 to destination hypervisor 132, the first phase of migrating VM 110 from source hypervisor 120 to destination hypervisor 132 is complete. After completion of the first phase of migration and at an action 226, source hypervisor 120 may send a request 228 to guest 112 to cease the operation of applying pattern 150 to inactive pages of plurality of pages 210. In another example, if a threshold period of time has elapsed, source hypervisor 120 may send request 228 to guest 112 to cease the operation of applying pattern 150 to inactive pages of plurality of pages 210. In this example, source hypervisor 120 may determine that guest 112 is taking too long to respond, and may decide to traverse plurality of pages 210. Guest 112 may receive message 228 and cease traversing plurality of pages 210 and applying pattern 150 to the inactive traversed pages.

C. Live Virtual Machine Migration

If guest 112 is still running during the first phase of migration (e.g., one or more virtual processors associated with guest 112 is still running), an inactive memory page that was skipped during the first phase of migration may transition to an active memory page. For example, source hypervisor 120 may have determined that memory page 210N matched pattern 150 and thus did not transmit memory page 210N to destination hypervisor 132. In another example, source hypervisor 120 may have transmitted memory page 210N and guest 112 may have modified memory page 210N after it was transmitted to destination hypervisor 132. In both of these scenarios, it may be desirable to re-transmit the memory page 210N to destination hypervisor 132 so that it has VM 110's most up-to-date information.

In some examples, source hypervisor 120 identifies a set of dirty pages of plurality of pages 210 that was modified by guest 112 while source hypervisor 120 traversed the plurality of pages 210 during the first phase of migration. The set of dirty pages includes one or more dirty memory pages. In an example, source hypervisor 120 identifies the set of dirty pages by reading one or more bits in dirty bitmap 126 (see FIG. 1). Dirty bitmap 126 includes a plurality of bits, where each bit of the plurality of bits corresponds to a memory page in guest memory and indicates whether the memory page is dirty. Source hypervisor 120 may read a bit in dirty bitmap 116 and determine, based on the bit's value, whether guest 112 has modified the memory page corresponding to the bit. If guest 112 has modified the memory page corresponding to the bit, the memory page is a dirty memory page. If guest 112 has not modified the memory page corresponding to the bit, the memory page is not a dirty memory page.

Source hypervisor 120 transmits the set of dirty pages to destination hypervisor 132. The set of dirty pages of plurality of pages 210 is transmitted to destination hypervisor 132 after source hypervisor 120 has transmitted each active page in guest memory 114 to destination hypervisor 132 (i.e., after the first phase of migration has completed). Source hypervisor 120 may detect that a memory page in guest memory 114 is dirty and then clear the memory page's corresponding bit in dirty bitmap 126 after source hypervisor 120 transmits the dirty memory page to destination hypervisor 132. Clearing a bit in dirty bitmap 126 may include setting the bit to a value indicating that the bit's corresponding memory page is not dirty. Source hypervisor 120 may continue to transmit the dirty pages to destination hypervisor 132 until a condition is satisfied. In some examples, this condition is satisfied if an estimation of time to send the dirty pages is below a threshold amount of time.

D. Allocate Memory at the Destination Hypervisor

Figure 3:
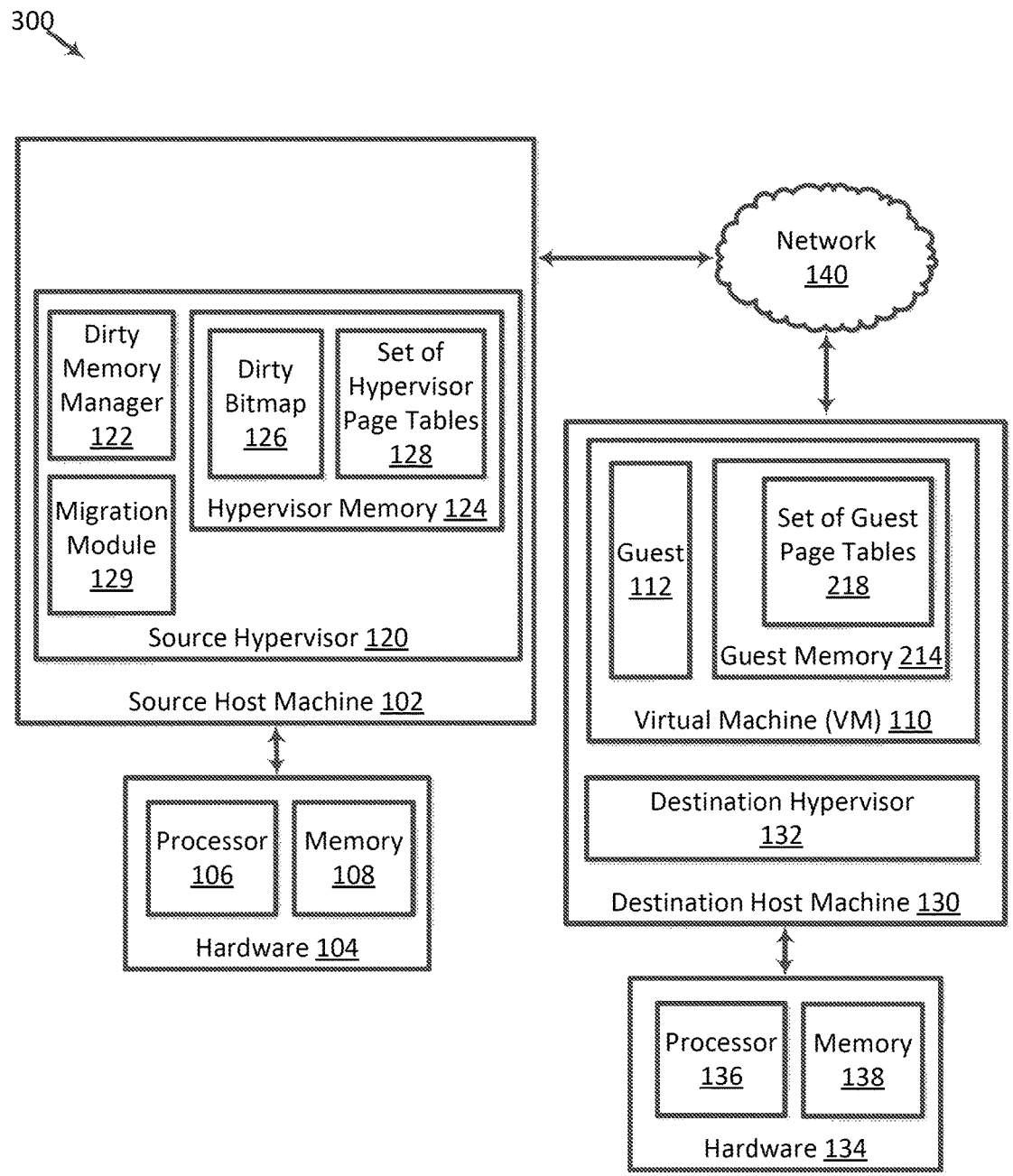
FIG. 3 is a block diagram illustrating a system for migrating a virtual machine from a source hypervisor to a destination hypervisor in accordance with one or more embodiments.

FIG. 3 is a block diagram illustrating a system 300 for migrating a virtual machine from a source hypervisor to a destination hypervisor in accordance with one or more embodiments. In FIG. 3, VM 110 has migrated from source hypervisor 120 to destination hypervisor 132 running on destination host machine 130. In FIG. 3, VM 110 running on destination host machine 130 is allocated a guest memory 214, which may include a set of guest page tables 218.

As discussed, during the first phase of migration, migration module 129 sends guest 112's active memory pages to destination hypervisor 132 and skips guest 112's inactive memory pages. During the second phase of migration, migration module 129 identifies a set of dirty pages of plurality of pages 210 that was modified by guest 112 while source hypervisor 120 traversed plurality of pages 210 during the first phase of migration. Source hypervisor 120 sends the set of dirty pages to destination hypervisor 132.

Source hypervisor 120 may stop VM 110 on source host machine 102. Migration module 129 may determine that the migration of VM 110 to destination hypervisor 132 is complete after VM 110 has stopped running on source host machine 102 and all memory pages in guest memory 114 that are dirty and active have been transmitted to destination hypervisor 132. After VM 110 has stopped running on source host machine 102, source hypervisor 120 may transfer the device state information associated with VM 110 (e.g., state information of devices assigned to VM 110) and all the dirty pages from the last round to destination hypervisor 132. Destination hypervisor 132 may receive this device state information and the dirty pages, and start running VM 110 on destination host machine 130. Destination hypervisor 132 may continue to run VM 110 until destination hypervisor 132 receives, for example, a request to suspend, exit, or migrate VM 110.

As discussed above and further emphasized here, FIGS. 1, 2A, 2B, and 3 are merely examples, which should not unduly limit the scope of the claims.

Additionally, although source hypervisor 120 has been described as sending a request to a guest to apply a pattern to inactive pages in response to receiving an indication to migrate the virtual machine on which the guest runs to another hypervisor, this is not intended to be limiting. In an example, source hypervisor 120 may send the request to the guest to apply a pattern to inactive pages in response to an indication that the virtual machine is suspended or will be suspended. In another example, if a kernel shared memory (KSM) feature is running on source host machine 102, source hypervisor 120 may send the request to the guest to apply a pattern to inactive pages to speed up the processing at source host machine 102.

IV. Example Methods

Figure 4:
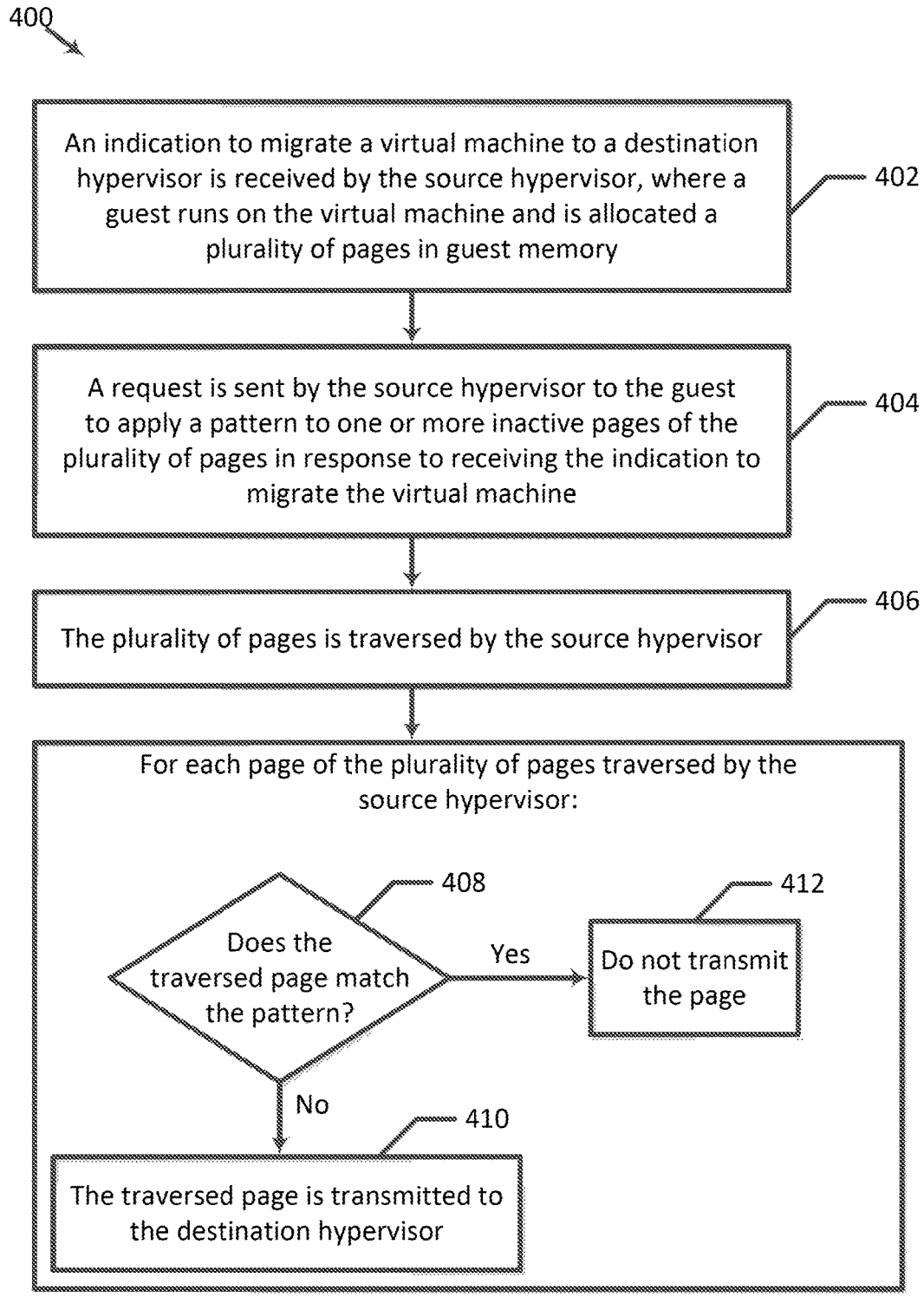
FIG. 4 is a flowchart illustrating a method of migrating a VM from a source hypervisor to a destination hypervisor in accordance with one or more embodiments.

FIG. 4 is a flowchart illustrating a method 400 of migrating a VM from a source hypervisor to a destination hypervisor in accordance with one or more embodiments. Method 400 is not meant to be limiting and may be used in other applications.

Method 400 includes blocks 402-412. In a block 402, an indication to migrate a VM to a destination hypervisor is received by a source hypervisor, where a guest runs on the VM and is allocated a plurality of pages in guest memory. In an example, source hypervisor 120 receives an indication to migrate VM 110 to destination hypervisor 132, where guest 112 runs on VM 110 and is allocated guest memory 114. In a block 404, a request is sent by the source hypervisor to the guest to apply a pattern to one or more inactive pages of the plurality of pages in response to receiving the indication to migrate the VM. In example, source hypervisor 120 sends request 206 to guest 112 to apply pattern 150 to one or more inactive pages of plurality of pages 210 in response to receiving the indication to migrate VM 110.

In a block 406, the plurality of pages is traversed by the source hypervisor. In an example, source hypervisor 120 traverses plurality of pages 210. For each page of the plurality of pages traversed by the source hypervisor, blocks 408 and 410 or 412 may be executed. Blocks 408 and 410 may represent the first phase of the migration of VM 110 from source hypervisor 120 to destination hypervisor 132. In block 408, it is determined whether the traversed page matches the pattern. In an example, source hypervisor 120 determines whether the traversed page matches pattern 150.

In response to a determination that the traversed page does not match the pattern, process flow proceeds from block 408 to block 410, in which the traversed page is transmitted to the destination hypervisor. In an example, source hypervisor 120 transmits the traversed page to destination hypervisor 132 if the traversed page does not match pattern 150. In contrast, in response to a determination that the traversed page matches the pattern, process flow proceeds from block 408 to block 412, in which the traversed page is skipped and not transmitted to the destination hypervisor. In an example, source hypervisor 120 skips the inactive traversed page.

It is understood that additional processes may be inserted before, during, or after blocks 402-412 discussed above. It is also understood that one or more of the blocks of method 400 described herein may be omitted, combined, or performed in a different sequence as desired. In some embodiments, one or more actions illustrated in blocks 402-412 may be performed for any number of VM migrations from source hypervisor 120 to another destination hypervisor.

Figure 5:
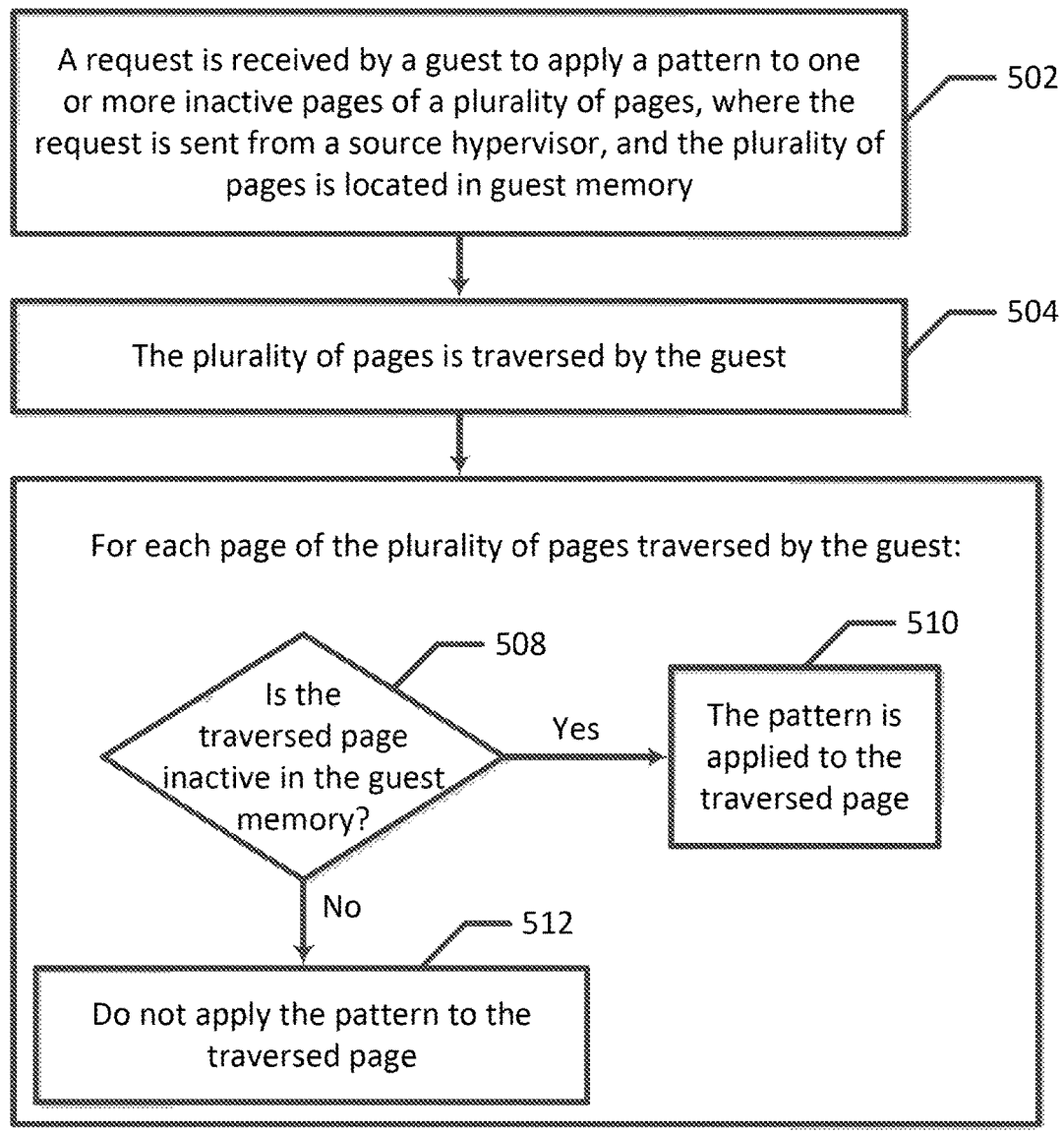
FIG. 5 is a flowchart illustrating a method of marking inactive guest memory pages by a guest in accordance with one or more embodiments.

FIG. 5 is a flowchart illustrating a method 500 of marking inactive guest memory pages by a guest in accordance with one or more embodiments. Method 500 is not meant to be limiting and may be used in other applications.

Method 500 includes blocks 502, 504, 508, 510, and 512. In a block 502, a request is received by a guest to apply a pattern to one or more inactive pages of a plurality of pages, where the request is sent from a source hypervisor, and the plurality of pages is located in guest memory. In an example, guest 112 receives request 206 to apply pattern 150 to one or more inactive pages of plurality of pages 210, where request 206 is sent from source hypervisor 120, and plurality of pages 210 is located in guest memory 114.

In a block 504, the plurality of pages is traversed by the guest. In an example, guest 112 traverses plurality of pages 210. For each page of the plurality of pages traversed by the guest, blocks 508 and 510 or 512 may be executed. A time period in which blocks 508, 510, and/or 512 are executed may overlap with a time period in which blocks 508, 510, and/or 512 are executed. In block 508, it is determined whether the traversed page is inactive in the guest memory. In an example, source hypervisor 120 determines whether the traversed page is inactive in guest memory 114.

In response to a determination that the traversed page is inactive in the guest memory, process flow proceeds from block 508 to block 510, in which the pattern is applied to the traversed page. In an example, guest 112 applies the pattern to the traversed page if the traversed page is inactive in guest memory 114. In contrast, in response to a determination that the traversed page is not inactive (i.e., the traversed page is active), process flow proceeds from block 508 to block 512, in which the pattern is not applied to the traversed page. In an example, guest 112 does not apply the pattern to the traversed page if the traversed page is not inactive.

It is understood that additional processes may be inserted before, during, or after blocks 502, 504, 508, 510, and 512 discussed above. It is also understood that one or more of the blocks of method 500 described herein may be omitted, combined, or performed in a different sequence as desired. In some embodiments, one or more actions illustrated in blocks 502, 504, 508, 510, and 512 may be performed for any number of VM migrations from source hypervisor 120 to another destination hypervisor.

V. Example Computing System

Figure 6:
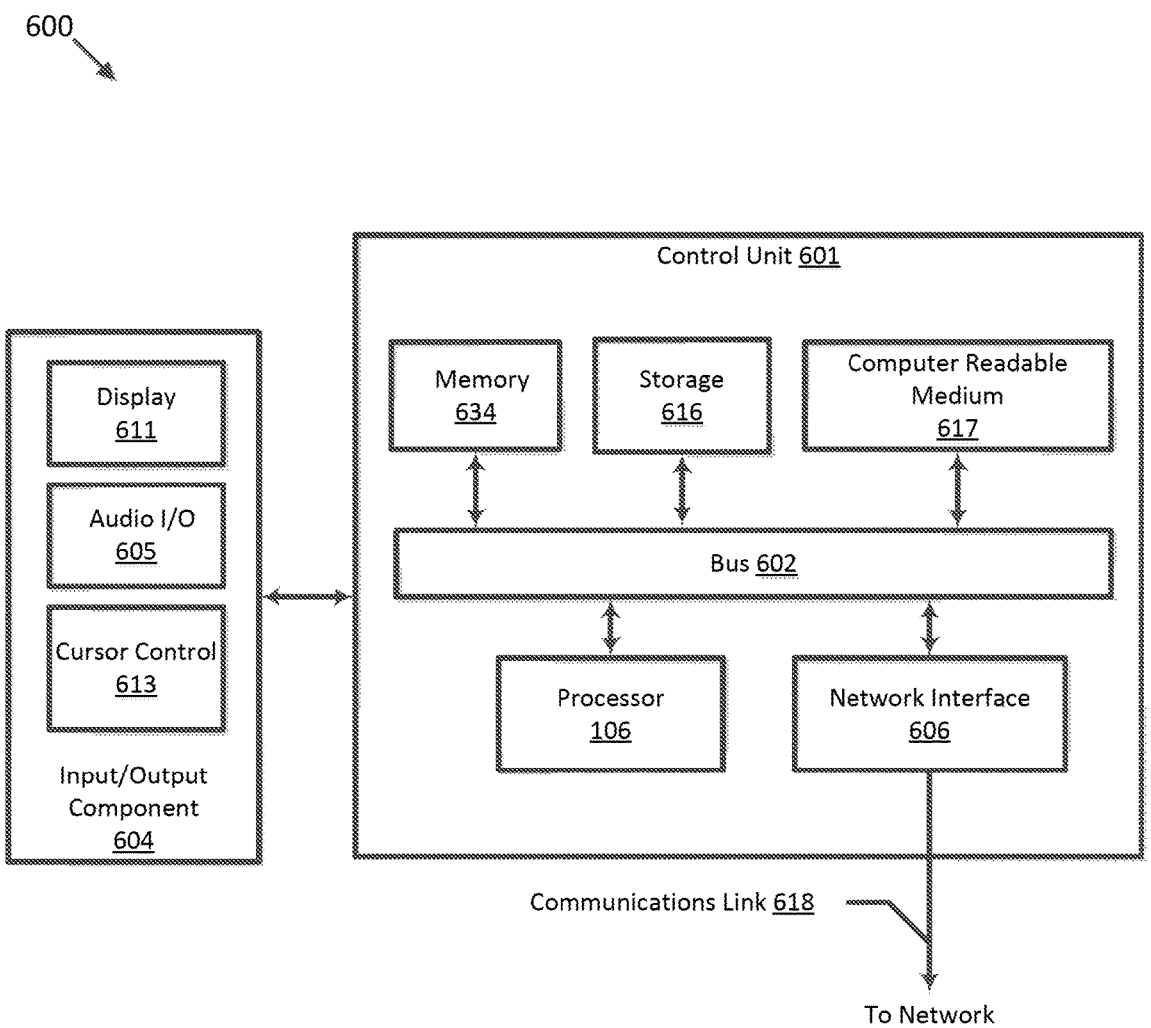
FIG. 6 is a block diagram of an electronic system suitable for implementing one or more embodiments of the present disclosure.

FIG. 6 is a block diagram of a computer system 600 suitable for implementing one or more embodiments of the present disclosure. Each of source hypervisor 120, destination hypervisor 132, and VM 110 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Processor 106, which may be a micro-controller, digital signal processor (DSP), or other processing component, processes these various signals, such as for display on computer system 600 or transmission to other devices via communications link 618. Components of computer system 600 also include a system memory component 634 (e.g., RAM), a static storage component 616 (e.g., ROM), and/or a computer-readable medium 617. Computer system 600 performs specific operations by processor 106 and other components by executing one or more sequences of instructions (e.g., method 400 or method 500) contained in system memory component 634.

Components include an input/output (I/O) component 604 that processes a user action, such as selecting keys from a keypad/keyboard, selecting one or more buttons or links, etc., and sends a corresponding signal to bus 602. I/O component 604 may include an output component such as a display 611, and an input control such as a cursor control 613 (such as a keyboard, keypad, mouse, etc.). In some examples, an administrator may provide an input indication to source hypervisor 120 to migrate VM 110 to destination hypervisor 132. An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via communications link 618 to a network. For example, source hypervisor 120 may send memory pages to destination hypervisor 132 using network interface 606. In an embodiment, the transmission is wireless, although other transmission mediums and methods may also be suitable.

Logic may be encoded in computer-readable medium 617, which may refer to any medium that participates in providing instructions to processor 106 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer-readable medium. Transmission media may take the form of acoustic or light waves, such as those generated during radio wave, optical, and infrared data communications.

Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 400 or method 500) to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer-readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of migrating a virtual machine from a source hypervisor to a destination hypervisor, comprising:
   receiving, by a source hypervisor running a virtual machine, an indication to migrate the virtual machine to a destination hypervisor, wherein a guest runs on the virtual machine and is allocated a plurality of pages in guest memory;
   sending, by the source hypervisor, a request to the guest to apply a pattern to one or more inactive pages of the plurality of pages in response to receiving the indication to migrate the virtual machine;
   during a first phase:
      traversing, by the source hypervisor, the plurality of pages; and
      for each page traversed by the source hypervisor:
         determining whether the traversed page matches the pattern; and
         transmitting the traversed page to the destination hypervisor if the traversed page does not match the pattern; and
   during a second phase:
      identifying a set of one or more dirty pages of the plurality that was modified by the guest while the source hypervisor traversed the plurality; and
      transmitting the set of one or more dirty pages to the destination hypervisor, wherein the second phase occurs after the first phase.

2. The method of claim 1, wherein the traversed page is not transmitted to the destination hypervisor if the traversed page matches the pattern.

3. The method of claim 1, wherein the pattern is a zero page pattern.

4. The method of claim 1, wherein sending the first request includes a request to perform an operation of applying the pattern to one or more inactive pages of the plurality of pages, the method further comprising:
   sending, by the source hypervisor, a second request to the guest to cease the operation.

5. The method of claim 1, further comprising:
   receiving, at the guest, the request to apply the pattern to one or more inactive pages of the plurality of pages;
   traversing, by the guest, the plurality of pages; and
   for one or more pages traversed by the guest:
      determining whether the traversed page is inactive; and
      applying the pattern to the traversed page if the traversed page is inactive, wherein the guest does not apply the pattern to the traversed page if the traversed page is active.

6. The method of claim 1, wherein the set of dirty pages is transmitted to the destination hypervisor after the source hypervisor has transmitted each active page in the guest memory to the destination hypervisor.

7. The method of claim 1, wherein identifying the set of dirty pages includes reading one or more bits in a dirty bitmap that includes a plurality of bits, wherein each bit of the plurality of bits corresponds to a memory page in guest memory and indicates whether the memory page is dirty, and wherein the set of dirty pages includes the one or more dirty memory pages.

8. The method of claim 1, further comprising:
   for each traversed page that matches the pattern, sending to the destination hypervisor a code indicating that the respective traversed page is inactive in guest memory.

9. The method of claim 1, wherein traversing, by the source hypervisor, the plurality of pages includes traversing the plurality of pages after a threshold amount of time has elapsed.

10. The method of claim 1, further comprising:
    receiving, by the source hypervisor, a message indicating that the guest has traversed a threshold amount of pages of the plurality of pages, wherein traversing the plurality of pages includes traversing the plurality of pages in response to receiving the message.

11. The method of claim 1, further comprising:
    receiving, by the source hypervisor, a message indicating that the guest has traversed a threshold percentage of pages of the plurality of pages, wherein traversing the plurality of pages includes traversing the plurality of pages in response to receiving the message.

12. A system for migrating a virtual machine from a source hypervisor to a destination hypervisor, comprising:
    a source hypervisor that runs a virtual machine and receives an indication to migrate the virtual machine to a destination hypervisor, wherein in response to receiving the indication to migrate the virtual machine, the source hypervisor sends a request to apply a pattern to one or more inactive pages of a plurality of pages to a guest running on the virtual machine;
    a migration module that during a first phase of migration (i) traverses the plurality of pages and (ii) for each traversed page, determines whether the traversed page matches the pattern, and transmits the traversed page to the destination hypervisor if the traversed page does not match the pattern, wherein during a second phase of migration, the migration module transmits a set of one or more dirty pages of the plurality to the destination hypervisor; and a dirty memory manager that during the second phase identifies the set of one or more dirty pages of the plurality that was modified by the guest while the migration module traversed the plurality.

13. The system of claim 12, wherein for each memory page of the plurality of memory pages, the guest determines whether the respective page is inactive, and applies the pattern to the traversed page if the traversed page is inactive.

14. The system of claim 13, wherein the guest does not apply the pattern to the traversed page if the traversed page is active.

15. The system of claim 12, wherein during the first phase, the migration module does not transmit the traversed page to the destination hypervisor if the traversed page matches the pattern.

16. The system of claim 13, wherein the guest applies the pattern to a traversed page before the migration module initiates traversing the plurality of pages.

17. A non-transitory machine-readable medium comprising a plurality of machine-readable instructions that when executed by one or more processors are adapted to cause the one or more processors to perform a method comprising:

receiving, by a source hypervisor running a virtual machine, an indication to migrate the virtual machine to a destination hypervisor, wherein a guest runs on the virtual machine and is allocated a plurality of pages in guest memory;

sending, by the source hypervisor, a request to the guest to apply a pattern to one or more inactive pages of the plurality of pages in response to receiving the indication to migrate the virtual machine;

during a first phase:
  traversing, by the source hypervisor, the plurality of pages; and
  for each page traversed by the source hypervisor:
    determining whether the traversed page matches the pattern; and
    transmitting the traversed page to the destination hypervisor if the traversed page does not match the pattern; and during a second phase:
  identifying a set of one or more dirty pages of the plurality that was modified by the guest while the source hypervisor traversed the plurality; and
  transmitting the set of one or more dirty pages to the destination hypervisor, wherein the second phase occurs after the first phase.

18. The system of claim 12, further comprising:
a guest memory that stores the pattern and the plurality of memory pages,
wherein the source hypervisor allocates the guest memory to the guest,
wherein the guest receives the request from the source hypervisor and determines that a first one of the plurality of memory pages is inactive, and wherein the guest applies the pattern to the first one of the plurality of memory pages in response to a determination that the first one is inactive.

19. The system of claim 12, wherein the source hypervisor includes the migration module and the dirty memory manager.

20. The system of claim 12, wherein the first phase of migration is completed before initiation of the second phase of migration.

* * * * *